United States Patent [19]
Gami et al.

[11] Patent Number: 5,246,479
[45] Date of Patent: * Sep. 21, 1993

[54] DRIVE MOTOR CONTROLLER FOR LOW POWER DISK DRIVE

[75] Inventors: Bipin V. Gami, Northridge; Russell H. Jacobs, Thousand Oaks, both of Calif.

[73] Assignee: Micropolis Corporation, Chatsworth, Calif.

[*] Notice: The portion of the term of this patent subsequent to Nov. 3, 2009 has been disclaimed.

[21] Appl. No.: 714,298

[22] Filed: Jun. 18, 1991

Related U.S. Application Data

[63] Continuation-in-part of Ser. No. 556,575, Jul. 20, 1990, Pat. No. 5,161,073.

[51] Int. Cl.⁵ .................. G11B 19/28; G11B 19/00
[52] U.S. Cl. ........................... 360/73.03; 360/71
[58] Field of Search .............. 360/73.03, 73.01, 71, 360/75, 74.1, 97.01, 98.01, 98.07, 99.08; 318/254, 599

[56] References Cited
U.S. PATENT DOCUMENTS

| | | | |
|---|---|---|---|
| 4,359,674 | 11/1983 | Gotou | 318/318 |
| 4,527,102 | 7/1985 | Gotou | 318/254 |
| 4,786,995 | 11/1988 | Stupeck et al. | 360/75 |
| 4,831,469 | 5/1989 | Hanson et al. | 360/75 |
| 4,839,754 | 6/1989 | Gami et al. | 360/97.01 |
| 4,843,288 | 6/1989 | Volz et al. | 318/599 |

OTHER PUBLICATIONS
"Peripherals", J. Voelcker, IEEE Spectrum, Feb. 1990.

*Primary Examiner*—Stuart S. Levy
*Assistant Examiner*—Craig A. Renner
*Attorney, Agent, or Firm*—Poms, Smith, Lande & Rose

[57] ABSTRACT

A hard disk drive digital storage system provides increased power efficiency and reduced power losses by using a switching regulator type DC to DC power converter, to control spindle motor speed, in which a variable duty cycle, low "ON" resistance n-channel power MOSFET transistor is located near the ground side of the motor drive circuit. A voltage booster circuit provides higher gate control switching voltages to the motor power phase commutation switching transistors. A sense resistor is connected between the converter and ground, and the voltage developed across this sense resistor provides a signal which is coupled to the motor control circuit to vary the duty cycle of the converter to regulate the peak current applied to the motor.

20 Claims, 1 Drawing Sheet

DRIVE MOTOR CONTROLLER FOR LOW POWER DISK DRIVE

RELATED PATENT APPLICATIONS

This is a continuation-in-part of U.S. patent application Ser. No. 556,575, filed Jul. 20, 1990, now U.S. Pat. No. 5,161,073, issued Nov. 3, 1992.

FIELD OF THE INVENTION

This invention relates to high speed Winchester-type or hard disk drive storage systems.

BACKGROUND OF THE INVENTION

It has previously been proposed to use switching regulator power supplies or converters in hard disk drives, as shown for example in U.S. Pat. No. 4,839,754, granted Jun. 13, 1989; inventors: Bipin V. Gami and Ericson Dunstan, and assigned to the assignee of this invention.

In the field of hard disk drives, the 5¼-inch disk systems have Industry Standard over-all dimensions including a height of 3.25 inches (82.6 mm), a width of 5.75 inches (146 mm), and a depth of 8.00 inches (203 mm). Environmental standards have also been established, with the operating temperature extending from 5° C. to 50° C., and the non-operating or storage temperature extending from −40° C. to +65° C.

It has been customary to operate the disk drives so that the speed of rotation of the disks is 3600 rpm, which means that the disks make one revolution in 16.67 milliseconds. For such systems, the average latency time or time to access a sector of digital data is approximately 8.33 milliseconds, or one-half the time for one revolution. Several years ago, the average seek time for accessing different data tracks on a hard disk drive was about 32 milliseconds, and this has now been reduced to about 12 milliseconds, with improved technological developments.

Now, in order to reduce the latency time, certain hard disk drive motor speeds are being increased from 3600 rpm to 5400 rpm, thereby reducing the average time to access a sector on a given data track from about 8.33 milliseconds to about 5.56 milliseconds.

With increased speed, however, the drive power requirements have increased, as the required drive power increases with increased speed as the square of the speed. In this regard, some manufacturers have been forced to provide heat sinks or cooling fins which extend beyond the Industry Standard dimensional limitations for specific hard disk drives as set forth hereinabove.

In the motor control circuit of U.S. Pat. No. 4,839,754 including the switching regulator power converter, a p-channel Metal Oxide Semiconductor Field Effect Transistor (MOSFET), was employed to convert power from the 12 volt supply level to a lower voltage to power the 3600 rpm motor, with much greater efficiency than is obtained with conventional linear power regulators. However, the p-channel power MOSFET has a resistance of about two to three times that of its complementary type n-channel power MOSFET (typically 0.3 ohm for a p-channel and 0.1 ohm for an n-channel device); and with the circuit parameters of a 5400 rpm hard disk drive motor, the resistance of this p-channel MOSFET increases the circuit power dissipation to undesirably high levels.

Accordingly, a principal object of the present invention is to reduce the power requirements of the spindle drive circuit for hard disk drives, particularly those having high speed spindle motors, such as the 5400 rpm motors.

SUMMARY OF THE INVENTION

In accordance with one illustrative embodiment of the invention, a switching regulator type power supply or D.C. to D.C. converter for a 5400 rpm motor has been designed with low power dissipation. With a plus 12 volt standard power supply for a hard disk drive circuit of the general type described in the above cited patent, the switching transistor for the switching regulator is located near the ground side of the circuit, so that a low resistance n-channel power MOSFET switching transistor may be employed. Also, the gate control voltage for the n-channel phase commutation MOSFET transistors supplying phased current to the motor is boosted up from the 12 volt supply level to 18 volts, to positively operate these commutation transistors.

It is noted that the power to the motor may be varied by varying the duty cycle of the switching transistor in the switching regulator power supply or converter; and the switching regulator power supply or converter includes (1) an input low-pass filter to ensure that switching regulator current fluctuations are not reflected back into the 12-volt power supply; and (2) an output low-pass filter to smooth the current pulses from the power supply switching transistor.

In accordance with a broader aspect of the invention, a switching regulator power supply or converter for a high speed Winchester-type disk drive is located on the ground side of the power circuit and employs a low "on-resistance" n-type or n-channel transistor, preferably a power MOSFET.

In accordance with an additional feature of the invention, the sense resistor is connected between the switching regulator and ground, and therefore measures the current being drawn from the power supply; whereas the sense resistor of the prior system of U.S. Pat. No. 4,839,754 measures only the motor current, and thus does not indicate total power drawn from the power supply, which may involve variation in switching regulator losses, with temperature, duty cycle, and other factors.

It is noted in passing that the conventional and logical location for a switching regulator type power supply is at the high voltage input to the circuit; but the present inventors have determined that the unusual location of the switching power converter at the ground side of this type of disk drive circuit, and the choice of a low "on-resistance" n-channel power MOSFET switching transistor, serve to significantly increase the efficiency of the circuit and reduce power losses and heating.

The operational versatility of this power converter circuit allows for an easy and independent choice in selection of motor torque constant ($K_t$) and winding resistance ($R_m$) for a given size of the motor. Thus, for example, a higher mechanical output power and a low back EMF voltage of constant spindle motor is needed to run the motor at 5400 RPM. This means that a relatively low torque constant ($K_t$) and winding resistance ($R_m$) motor is required. However, with a lower torque constant, a higher start and run current, is required. This requires that more power must be supplied to the motor. These factors mean that efficient power management is needed both in the switching mode power converter and in the other spindle driver circuits at higher motor speeds such as 5400 RPM. By way of specific example, a 5400 RPM motor may have a torque constant of about 1.6 ounce-inches per ampere, and a resistance of about 0.45 ohm, as compared with the comparable figures of about 2.5 ounce-inches per ampere and 0.8 ohm for a 3600 RPM motor.

Other objects, features and advantages of the present invention will become apparent from a consideration of the following detailed description from the accompanying drawings.

DETAILED DESCRIPTION OF PREFERRED EMBODIMENT

Figure 1:
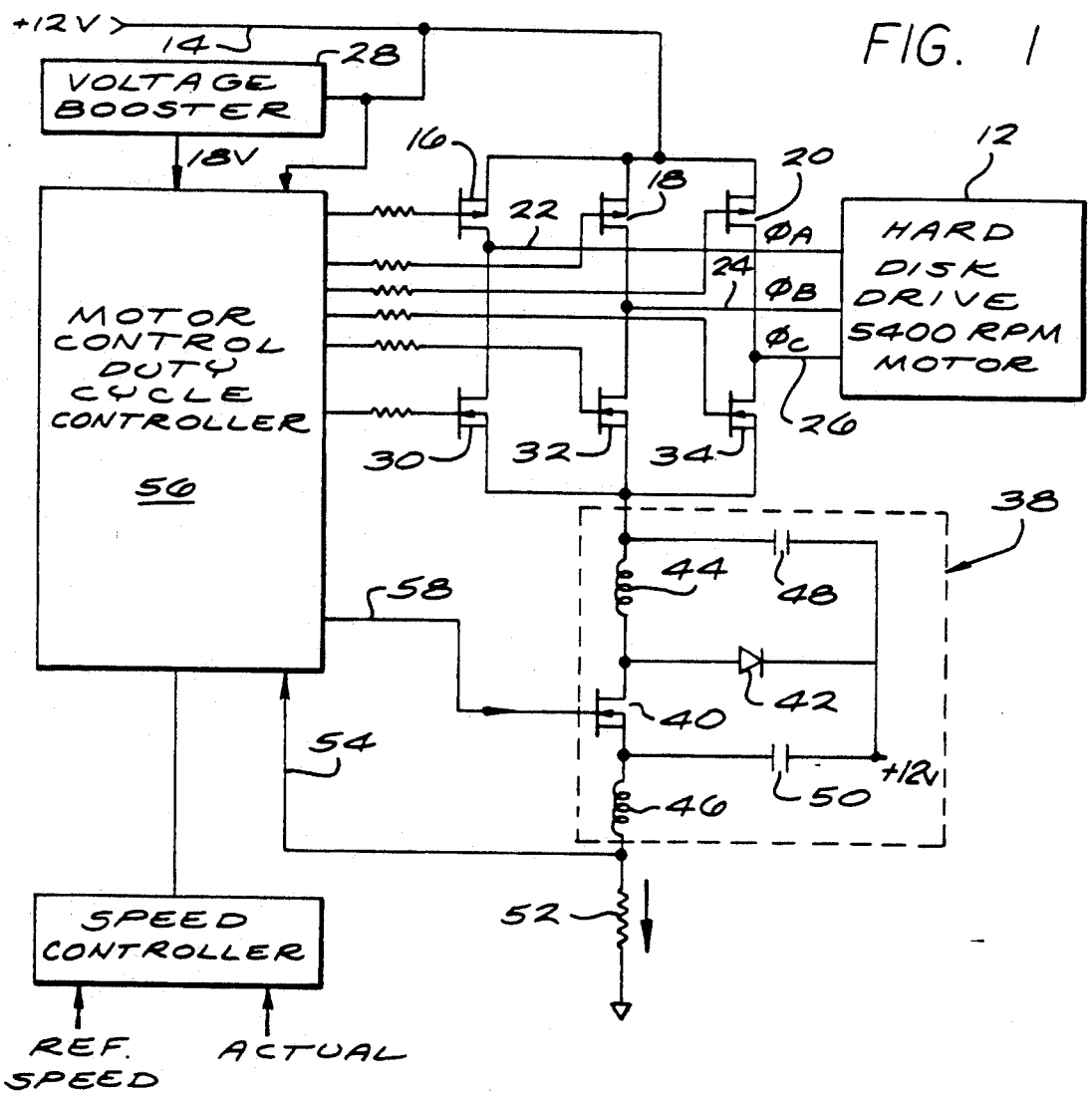
FIG. 1 is a block diagram of a hard disk drive storage system illustrating the principles of the present invention.

Referring more particularly to the drawings, FIG. 1 is a block circuit diagram of a hard disk drive system including a hard disk drive assembly 12 including a motor which rotates at 5400 rpm.

Incidentally, the motor may be of the type disclosed in U.S. Pat. No. 4,839,754, cited above, with certain significant differences, as mentioned above. However, the motor may have a permanent magnet rotor which is generally cylindrical in its configuration, and to which the storage disks are mounted. In addition, the motor may have a fixed inner stator having three phases which are successively energized, in a known manner, to couple with the permanent magnet rotor as the successive phases are energized. It is also noted that the drawings and text of U.S. Pat. No. 4,839,754 are hereby incorporated into the present patent application by reference, with the differences between the system as disclosed in that patent and the present invention being specifically pointed out in the present case. With regard to the motor, for example, the motor torque constant has been reduced from approximately 2.5 oz-in/amp in the 3600 rpm motor of U.S. Pat. No. 4,839,754, to approximately 1.6 oz-in/amp in the present 5400 rpm motor. In addition, the resistance has been reduced from approximately 0.8 ohms to approximately 0.45 ohms. This is accomplished principally by employing larger diameter wire in the stator windings, and correspondingly fewer turns.

Now, returning to FIG. 1 of the drawings, a standard 12-volt power supply input is provided on lead 14. This is coupled to three p-channel field effect transistors, 16, 18 and 20, preferably power MOSFETS, which are connected to the motor assembly 12 by leads 22, 24 and 26, respectively. Leads 22, 24, and 26 correspond to phases A, B and C ($\phi A$, $\phi B$, and $\phi C$) respectively of hard disk drive motor 12. These p-channel transistors are normally held in the off state by the application of a positive voltage such as +12 volts, supplied by the 12-volt power supply, applied to the control gate electrodes of these transistors. They are selectively and sequentially turned on, by the application of a substantial negative signal, such as ground, to the gate electrode, relative to the source electrode. With the source electrode at the positive 12-volt potential of the power supply lead 14, a substantially lower potential, such as ground, applied to the gate electrode of these p-channel power MOSFETS, will turn them on. An additional set of three n-channel power MOSFETS 30, 32 and 34, are provided to give a return path from the motor assembly 12. Thus, for example, transistor 16 and transistor 32 may be turned on energizing one phase of the three-phase permanent magnet motor, and during the next sequential interval, these two transistors are turned off, and the next set of power MOSFETS, such as transistor 18 and transistor 34, may be rendered conductive so that the next phase of the windings of the stator of the permanent magnet motor is energized. It is further noted that a positive gate-to-source potential of +18 volts is employed to turn on the n-channel power MOSFET transistors, 30, 32 and 34. The voltage booster circuit 28 provides the +18 volts from which these commutation control signals are derived.

The switching regulator power supply or DC-to-DC converter circuitry 38 will now be described. It includes the n-channel power MOSFET switching transistor 40, the Schottky diode 42, the two inductors 44 and 46, and the two capacitors 48 and 50. The current drawn by the motor is indirectly sensed by the voltage developed across the resistor 52, and this signal is coupled on lead 54 back to the motor control and duty cycle controller 56. Positive pulses are applied on lead 58 to the gate electrode of the switching transistor 40, at a constant frequency, which is preferably relatively high, such as 100 or 200 kHz or higher. The width of the pulses applied to the gate of power MOSFET 40 is varied to vary the amount of current supplied to the motor 12. The mode of operation of the circuit 38 is substantially the same as has been described above in U.S. Pat. No. 4,839,754. In this regard, the low-pass filter provided by the inductor 44 and the capacitor 48 prevents high frequency components arising from the switching of transistor 40 from being fed back to the power supply to lead 14. Similarly, inductor 46 and capacitor 50 provide smoothing for the output direct current pulses from the switching transistor 40.

Returning to the sense resistor 52, it may be noted that the voltage developed across it is a direct indication of the current being drawn from the 12 volt power supply. This is in contrast to the sense resistor in the circuit of U.S. Pat. No. 4,839,754 in which the current through the sense resistor is that drawn by the motor, as discussed above. The voltage developed across sense resistor 52 is supplied to control circuit 56 and is processed with other signals to control the duty cycle of transistor 40, thereby controlling the maximum power drawn from the 12-volt power supply. For example, the total amount drawn from the 12 volt supply may not exceed 3.5 amperes, so the signal developed across the sense resistor indicates the level of current being drawn, and the control circuitry limits the duty cycle of the circuit 38 to avoid exceeding this limit.

As mentioned above, the n-channel power MOSFET switching transistor 40 has significantly lower resistance when it is turned on than the corresponding p-channel power MOSFET which was employed in the switching power regulator circuit of U.S. Pat. No. 4,839,754. Accordingly, the heat dissipation and power losses in the variable duty cycle switching transistor are significantly reduced, as compared with the circuit of U.S. Pat. No. 4,839,754.

Figure 2:
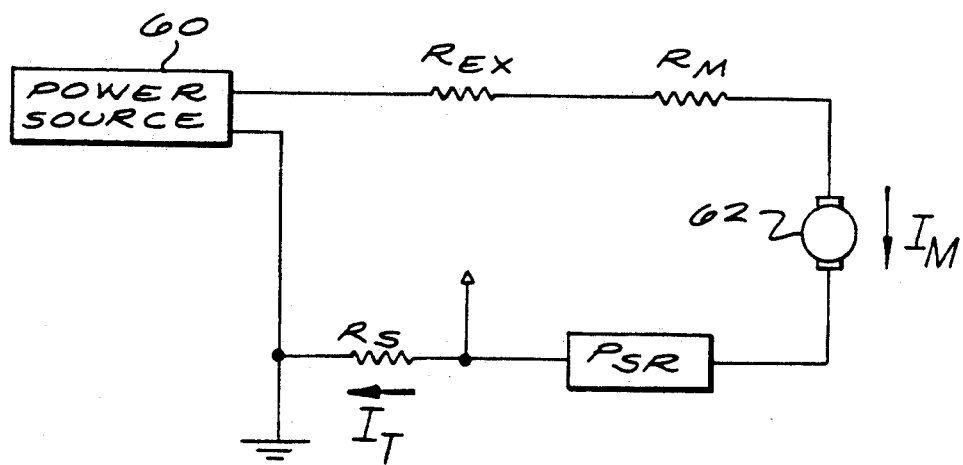
FIG. 2 is a simplified circuit diagram employed in the analysis of systems of the present type.

Attention will now be directed to FIG. 2 in which the power source 60 supplies power to the motor 62, with $R_M$ representing the resistance of the motor, $R_S$ representing the resistance of the sense resistor, and $R_{EX}$ representing the other external resistance. $P_{SR}$ represents the power dissipated in the switching regulator. The power source has a supply voltage $V_T$ of 12 volts, as mentioned above, and the maximum power supply total current $I_T$ available for driving the motor during starting from zero speed is 3.5 amperes. Accordingly:

$$\text{Available Power} = V_T \times I_T = 12 \times 3.5 = 42 \text{ watts} \quad (1)$$

It may be noted that the spindle motor needs approximately 6 amperes to start from zero speed to overcome stiction-friction forces exerted by its bearings and the head-media interface. Therefore, the motor current:

$$I_M = 6 \text{ Amperes.} \quad (2)$$

For the p-channel power MOSFET with "ON" resistance ($R_{on}$) of about 0.3 OHMS, the peak switching regulator transistor power dissipation is approximately as follows:

$$P_T = I^2_M \times R_{on} = (6)^2 \times 0.3 = 10.8 \text{ watts} \quad (3)$$

For the n-channel power MOSFET with "ON" resistance ($R_{on}$) of about 0.1 OHMS, the peak switching regulator transistor power dissipation is approximately as follows:

$$P_T = I^2_M \cdot R_{on} = (6)^2 \times 0.1 = 3.6 \text{ watts} \quad (4)$$

From these calculations, if a p-channel MOSFET is used as the switching transistor in the DC-to-DC converter, about 25% of the power is dissipated in the converter, while for the n-type MOSFET, the percentage power dissipation drops to about 9 percent.

Accordingly, the foregoing calculations confirm the very significant reduction in power losses and increase in efficiency achieved by the new circuit configuration.

In conclusion, it is to be understood that the foregoing detailed description and the accompanying drawings relate to one illustrative embodiment of the invention. Various changes and modifications may be made without departing from the spirit and scope thereof.

Thus, by way of example and not of limitation, alternative high speed transistors may be employed in place of MOSFET 40, different filter circuits may be employed in circuit 38 to accomplish the same function, other types of high speed motors may be employed instead of the 5400 rpm motor described hereinabove, and the principles of this invention are applicable to hard disk drives, both magnetic and optical, and having other than the 5¼-inch disk drive size. It is also noted that the duty cycle may be varied by using substantially constant width pulses with varying "off" time, thus changing the very high frequency of the cycle, instead of changing the pulse width at a constant frequency. Accordingly, the present invention is not limited to the specific arrangements as shown in the drawings and as described in detail hereinabove.

What is claimed is:

1. A high power efficiency, low power hard disk storage system comprising:
   a hard disk drive assembly including storage disks and a permanent magnet motor operative at a speed of about 3600 rpm or higher, and having a multiple phase stator;
   a positive power source for providing electrical power at approximately 12 volts;
   switching commutation circuit means for regulating said electrical power supplied to said multiple phase stator, coupled to said positive power source;
   a switching regulator power converter including an n-channel power MOSFET switching transistor connected between said switching commutation circuit means and ground; and
   means for applying substantially constant high frequency pulse switching signals to said n-channel power MOSFET switching transistor, said pulse switching signals providing a varying duty cycle to vary the power supplied form said power source to said motor;
   whereby the low resistance of the n-channel power MOSFET switching transistor significantly increases the efficiency and reduces the power dissipation of the system.

2. The high power efficiency, low power hard disk storage system as defined in claim 1 wherein said switching commutation circuit means includes a plurality of power MOSFET transistors having at least one gate, drain, and source.

3. The high power efficiency, low power hard disk storage system as defined in claim 1 wherein said means for applying substantially constant high frequency pulse switching signals to said n-channel power MOSFET switching transistor supply switching signals at a frequency 4. The high power efficiency, low power hard disk storage system as defined in claim 1 further including low-pass filter means for smoothing the substantially constant high frequency pulse switching signals passed by said n-channel power MOSFET switching transistor and additional low-pass filter means for preventing significant high frequency noise to be reflected back into the power source.

5. The high power efficiency, low power hard disk storage system as defined in claim 1 wherein a sense resistor is connected between said switching regulator power converter and ground to directly measure current drawn from said positive power source, and wherein circuit means are provided for employing a voltage detected across said sense resistor to control the power passed by said switching commutation circuit means to said multiple phase stator and to maximize the power applied to the multiple phase stator during start-up.

6. A high power efficiency, low power hard disk storage system as defined in claim 1:
   wherein said switching commutation circuit means includes a plurality of p-channel MOSFETS and a plurality of n-channel power MOSFETS; and
   said storage system further comprising voltage booster circuit means for providing a positive booster voltage greater than the positive power source voltage, and means for applying said positive booster voltage to gates of said n-channel power MOSFETS to fully turn on said n-channel power MOSFETS.

7. The high power efficiency, low power hard disk storage system comprising:
   a hard disk drive assembly including storage disks and a motor having multiple phase windings;
   a positive power source for providing electrical power to said motor;
   switching commutation circuit means for regulating said electrical power supplied to said multiple phase windings, coupled to said power source;

a switching regulator power converter including a high speed n-type power transistor connected between said switching commutation circuit means and ground; and means for applying high frequency pulse switching signals to said high speed n-type power transistor, said pulse switching signals providing a varying duty cycle to vary the power supplied form said power source to said motor.

8. The high power efficiency, low power hard disk storage system as defined in claim 7 wherein said switching commutation circuit means includes a plurality of metal oxide semiconductor field effect power transistors.

9. The high power efficiency, low power hard disk storage system as defined in claim 7 wherein said means for applying high frequency pulse switching signals to said n-type power transistor supply switching signals at a frequency above 60 kHz.

10. The high power efficiency, low power hard disk storage system as defined in claim 7 further including filter means for smoothing the high frequency pulse switching signals passed by said n-type power transistor and for preventing significant high frequency noise to be reflected back into the power source.

11. The high power efficiency, low power hard disk storage system as defined in claim 7 wherein said n-type power transistor is an n-channel metal oxide semiconductor field effect power transistor.

12. The high power efficiency, low power hard disk storage system as defined in claim 7 wherein a sense resistor is connected between said switching regulator power converter and ground, to directly measure current drawn form the power source, and wherein circuit means are provided for employing a voltage developed across said sense resistor to control the power passed by said switching commutation circuit means to said multiple phase windings and to maximize the power applied to the motor during start-up.

13. The high power efficiency, low power system as defined in claim 7 further including booster circuit means for providing a more positive voltage than said positive power source for selectively controlling said switching commutation circuit means.

14. A high power efficiency, lower power hard disk storage system comprising:

a hard disk drive assembly including storage disks and a motor having multiple phase windings;

a power source for providing electrical power to said motor;

switching commutation circuit means for supplying said electrical power to said multiple phase windings, coupled to said power source;

a switching regulator power converter including a high speed transistor having a low resistance in a conducting or "on" state and a substantially higher resistance in a non-conducting or "off" state, connected between said switching commutation circuit means and ground;

means for applying high frequency pulse switching signals to said high speed transistor, said pulse switching signals providing a varying duty cycle to vary the power supplied form said power source to said motor;

a sense resistor connected between said switching regulator power converter and ground; and feedback means for detecting a voltage developed across said sense resistor and using the detected voltage to controls said switching regulator power converter.

15. The high power efficiency, low power hard disk storage system as defined in claim 14 wherein said switching commutation circuit means includes a plurality of field effect transistors.

16. The high power efficiency, low power hard disk storage system as defined in claim 14 wherein said means for applying high frequency pulse switching signals to said high speed transistor supply switching signals at a frequency above 60 kHz.

17. The high power efficiency, low power hard disk storage system as defined in claim 14 further including filter means for smoothing the high frequency pulse switching signals passed by said high speed transistors and for preventing significant high frequency noise to be reflected back into the power source.

18. The high power efficiency, low power hard disk storage system as defined in claim 14 wherein said high speed transistor is an n-channel power MOSFET.

19. A system as defined in claim 14 wherein said power source is positive, and further including booster circuit means for providing a more positive voltage than said positive power source for selectively controlling said switching commutation circuit means.

20. A high power efficiency, switching spindle motor power regulator type, hard disk digital storage system comprising:

a hard disk drive assembly including storage disks and a motor having multiple phase windings;

a power source for providing electrical power to said motor;

switching commutation circuit means for supplying said electrical power to said multiple phase windings, coupled to said power source;

a DC-DC switching regulator power converter including a high speed transistor having low "on-resistance" connected between said switching commutation circuit means and ground; and means for applying high frequency pulse switching signals to said high speed transistor to vary the power supplied from said power source to said motor.

* * * * *